(12) United States Patent  (10) Patent No.: US 7,885,727 B2
Omote  (45) Date of Patent: Feb. 8, 2011

(54) ROBOT APPARATUS, INFORMATION PROCESSING METHOD AND PROGRAM

(75) Inventor: Masanori Omote, Kanagawa (JP)

(73) Assignee: Sony Corporation, Tokyo (JP)

(*) Notice: Subject to any disclaimer, the term of this patent is extended or adjusted under 35 U.S.C. 154(b) by 433 days.

(21) Appl. No.: 10/551,393

(22) PCT Filed: Mar. 18, 2004

(86) PCT No.: PCT/JP2004/003678

§ 371 (c)(1),
(2), (4) Date: Jun. 30, 2006

(87) PCT Pub. No.: WO2004/089579

PCT Pub. Date: Oct. 21, 2004

(65) Prior Publication Data

US 2006/0247825 A1  Nov. 2, 2006

(30) Foreign Application Priority Data

Apr. 1, 2003 (JP) .............................. 2003-098070

(51) Int. Cl.
*G06F 19/00* (2006.01)
*G05B 19/04* (2006.01)
*G05B 19/418* (2006.01)

(52) U.S. Cl. ...................... 700/245; 700/247; 700/249

(58) Field of Classification Search ................ 700/245, 700/247, 258, 259, 250; 318/568.11; 342/89, 342/353; 375/295, 316; 701/23, 207, 209, 701/213
See application file for complete search history.

(56) References Cited

U.S. PATENT DOCUMENTS 5,465,386 A * 11/1995 Barnes et al. .................. 455/15

(Continued)

FOREIGN PATENT DOCUMENTS

EP  1 103 449 A1  5/2001

(Continued)

OTHER PUBLICATIONS

Bischoff et al., Natural Communication and Iteraction with Humanoid Robots, 1999, IEEE, p. 1-8.*

(Continued)

*Primary Examiner*—Khoi Tran
*Assistant Examiner*—Nicholas Kiswanto
(74) *Attorney, Agent, or Firm*—Frommer Lawrence & Haug LLP; William S. Frommer; Ellen Marcie Emas (57) ABSTRACT

A robot apparatus, an information processing method and a program therefore are capable of notifying a user of the state of communication with an access point. A humanoid robot 5, which independently determines an action in accordance with an instruction from a user or a surrounding environment, communicates with an access point 2 based on IEEE 802.11b. For example, the robot 5 controls a household electrical appliance 4-1 through a network 3 and receives a command from a personal computer 4-2 over the network 3 to execute a predetermined process. The robot 5 measures the quality of communication with the access point 2 at regular intervals. When the communication quality of a predetermined level or lower is continued for a predetermined period, the robot 5 generates speech, e.g., "I cannot see the access point. What should I do?" and waits for an instruction from the user. When receiving an instruction from the user, the robot 5 takes an action according to the instruction.

21 Claims, 10 Drawing Sheets

U.S. PATENT DOCUMENTS

| | | | |
|---|---|---|---|
| 6,763,282 B2 * | 7/2004 | Glenn et al. | 700/245 |
| 7,016,707 B2 * | 3/2006 | Fujisawa et al. | 455/567 |
| 7,069,111 B2 * | 6/2006 | Glenn et al. | 700/245 |
| 2001/0020837 A1 | 9/2001 | Yamashita | |
| 2002/0181773 A1 | 12/2002 | Higaki | |
| 2003/0087607 A1 * | 5/2003 | Fraser et al. | 455/67.6 |
| 2004/0081128 A1 * | 4/2004 | Fiter et al. | 370/338 |

FOREIGN PATENT DOCUMENTS

| | | |
|---|---|---|
| EP | 1 195 231 A1 | 4/2002 |
| JP | 9 103979 | 4/1997 |
| JP | 2001-125641 | 5/2001 |
| JP | 2001 129787 | 5/2001 |
| JP | 2002 321177 | 11/2002 |
| JP | 2002 341937 | 11/2002 |
| JP | 2003 89079 | 3/2003 |
| JP | 2003-179538 | 6/2003 |
| JP | 2004-32062 | 1/2004 |

OTHER PUBLICATIONS

SRI, Integrated Visoin, Speech and Action, 1995, Internet, p. 1-2.*
Koninklijke Luchtvaart Maatschappij N.V. KLM Royal Dutch Airlines Holland, et al., appellants, United States Court of Appeals District of Columbia Circuit. 1960-1961, Internet, p.*
CAA, GASIL General Avialtion Safety Information Leaflet, 2002, Internet, p. 1-36.*
Flight Safety Foundation, Communication Problesm Contribute to Misperceptions of Evacuation Urgency, 2003, Internet, p. 1-8.*

* cited by examiner

ROBOT APPARATUS, INFORMATION PROCESSING METHOD AND PROGRAM

TECHNICAL FIELD

The present invention relates to robot apparatuses, information processing methods, and programs and, more particularly, to a robot apparatus which acts depending on the quality of communication of radio signals when communicating with a communication apparatus by radio, and an information processing method and a program therefor.

BACKGROUND ART

Figure 1:
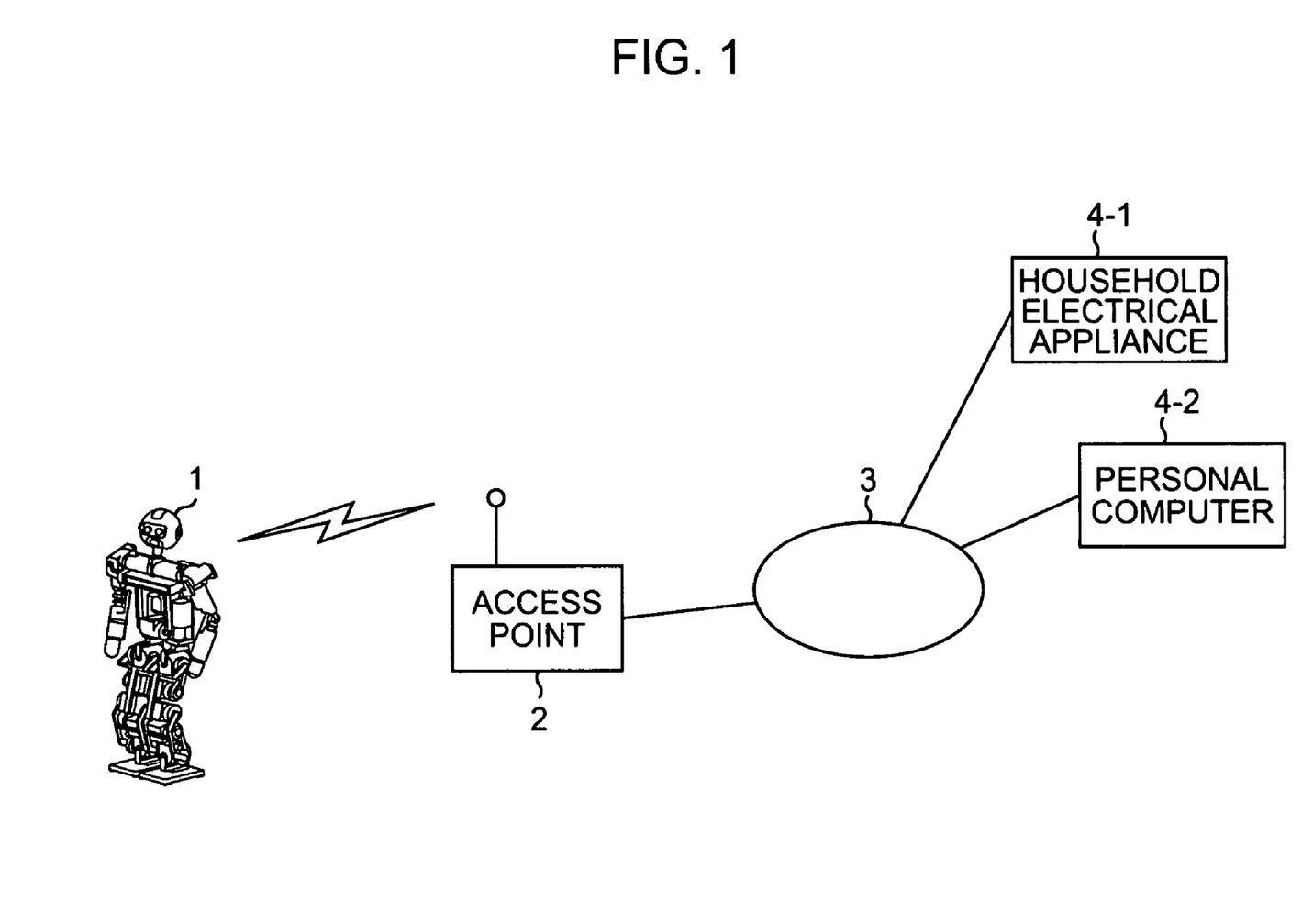
FIG. 1 is a block diagram of the structure of a typical robot system.

As shown in FIG. 1, autonomous robots 1, each of which independently acts in accordance with an instruction from a user or a surrounding environment, have been developed. Regarding some of the robots, e.g., for the purpose of controlling a household electrical appliance 4-1 through a network 3 and receiving a command from a personal computer 4-2 over the network 3, each robot can communicate with an access point 2. The robot 1 communicates with the access point 2 by radio based on, e.g., IEEE (Institute of Electrical and Electronic Engineers) 802.11b (refer to Japanese Unexamined Patent Application Publication No. 2001-191279).

The typical robot 1 has an indicator indicating the strength of a radio signal. For example, when a device, such as a microwave oven, for emitting electromagnetic waves is running, or when the robot 1 is hidden by an object while the robot 1 is independently moving, a user can recognize a reduction in the quality of communication with the access point 2.

However, according to an approach using such an indicator, when the user pays attention to anything, e.g., if the user interacts with the robot 1, the user cannot sufficiently recognize the state of communication.

DISCLOSURE OF INVENTION

The present invention is made in consideration of the above-mentioned situations. According to the present invention, functions (e.g., speech and gestures) peculiar to an autonomous robot are utilized, so that a user can be easily notified of the state of communication between the robot 1 and the access point 2.

The present invention provides an autonomous robot apparatus which communicates with a communication apparatus by radio and independently determines an action in accordance with an instruction from a user or a surrounding environment, the apparatus including: measuring means for measuring the quality of communication of radio signals received from the communication apparatus; determining means for determining the action on the basis of the communication quality measured by the measuring means; and processing means for performing a process of allowing the robot apparatus to take the action determined by the determining means.

The determining means may determine the action on the basis of the details of the current action of the robot apparatus and the communication quality measured by the measuring means.

The determining means may determine the generation of predetermined speech and the processing means may output the speech through a speaker.

The present invention provides an information processing method for an autonomous robot apparatus which communicates with a communication apparatus by radio and independently determines an action in accordance with an instruction from a user or a surrounding environment, the method including: a measuring step of measuring the quality of communication of radio signals received from the communication apparatus; a determining step of determining the action on the basis of the communication quality measured in the measuring step; and a processing step of performing a process of allowing the robot apparatus to take the action determined in the determining step.

The present invention provides a program for an autonomous robot apparatus which communicates with a communication apparatus by radio and independently determines an action in accordance with an instruction from a user or a surrounding environment, the program allowing a computer to execute a process including: a measuring step of measuring the quality of communication of radio signals received from the communication apparatus; a determining step of determining the action on the basis of the communication quality measured in the measuring step; and a processing step of performing a process of allowing the robot apparatus to take the action determined in the determining step.

According to the robot apparatus, the information processing method, and the program of the present invention, a process of measuring the quality of communication of radio signals received from the communication apparatus, determining an action on the basis of the measured communication quality, and allowing the robot apparatus to take the determined action is executed.

BEST MODE FOR CARRYING OUT THE INVENTION

Figure 2:
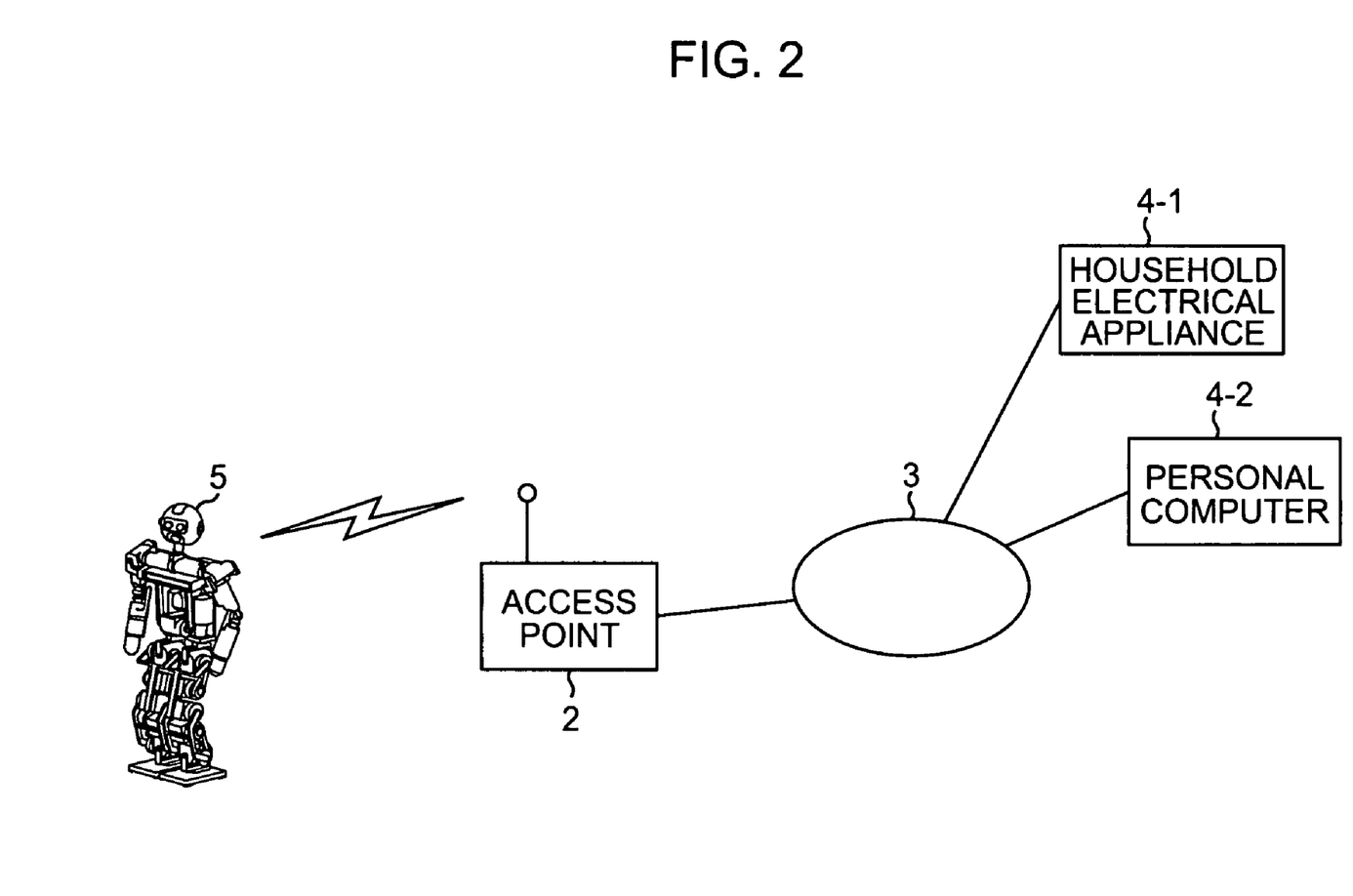
FIG. 2 is a block diagram of a robot system to which the present invention is applied.

FIG. 2 shows an example of the use of a robot 5 to which the present invention is applied.

The humanoid robot 5, which independently determines an action in accordance with an instruction from a user or a surrounding environment, communicates with an access point 2 based on IEEE802.11b. For example, the robot 5 controls a household electrical appliance 4-1 via a network 3 and receives a command from a personal computer 4-2 over the network 3 to execute a predetermined process.

Figure 3:
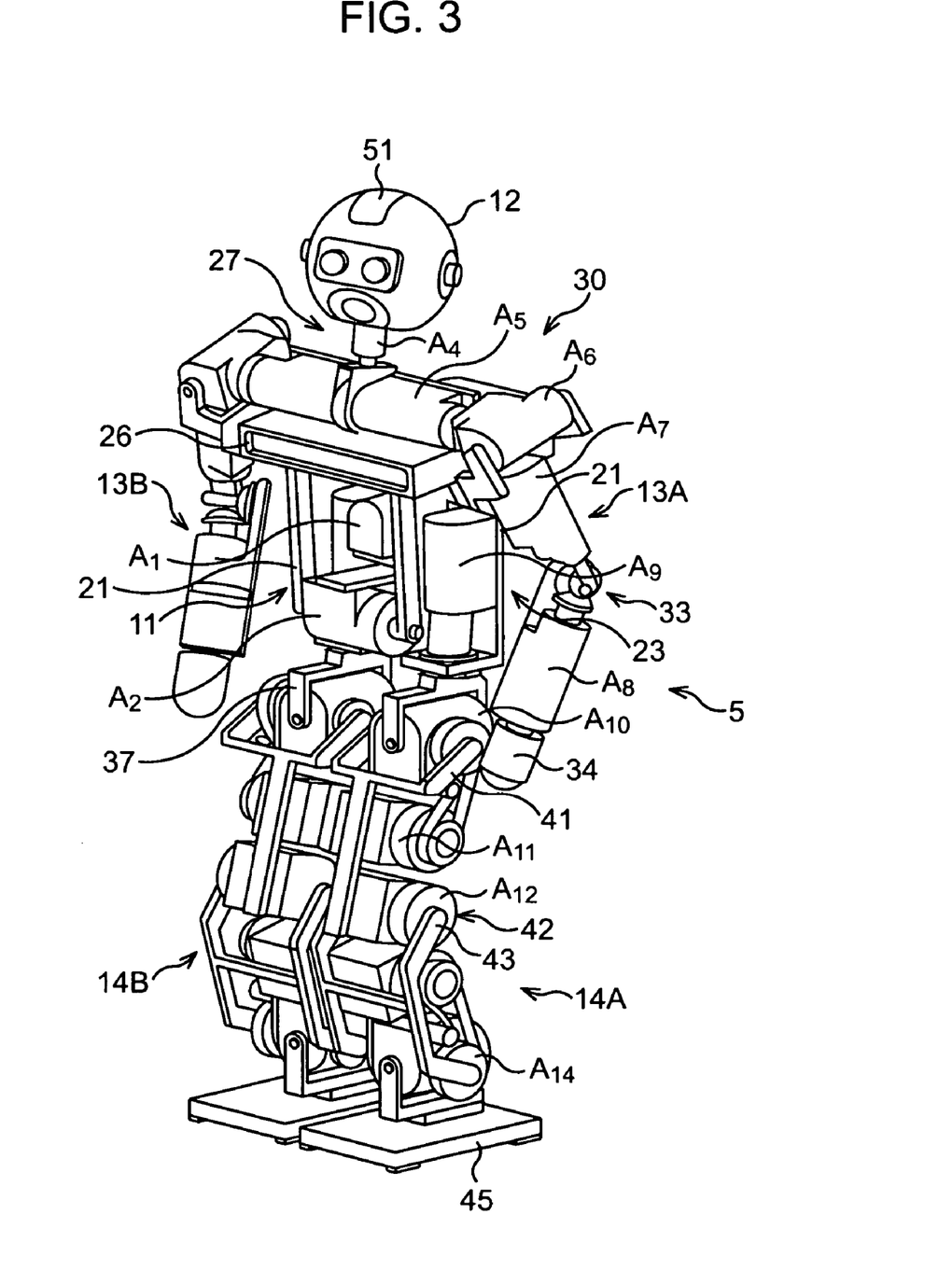
FIG. 3 is an external perspective view of a robot in FIG. 2.
Figure 4:
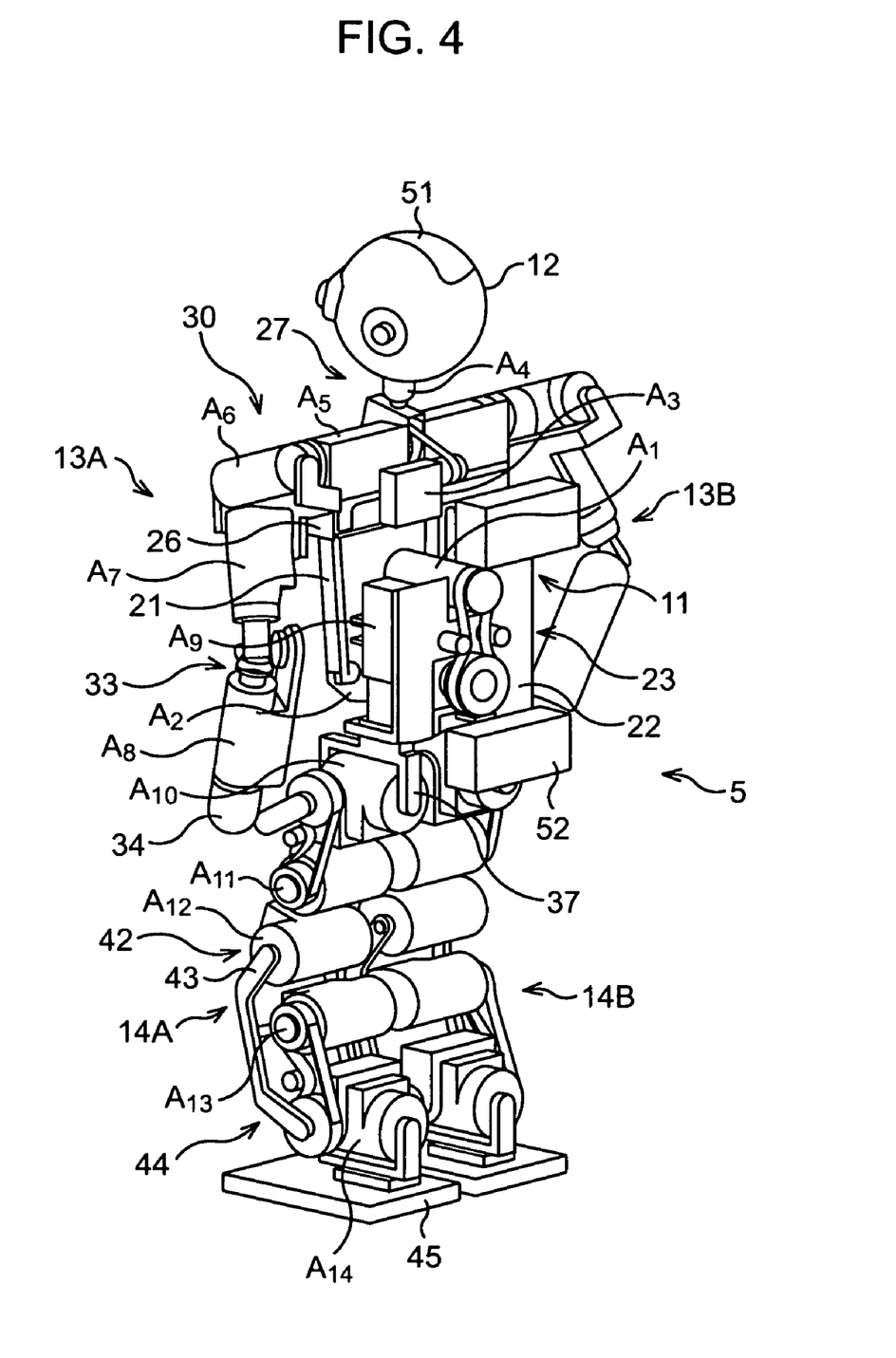
FIG. 4 is an external perspective view of the rear of the robot in FIG. 2.
Figure 5:
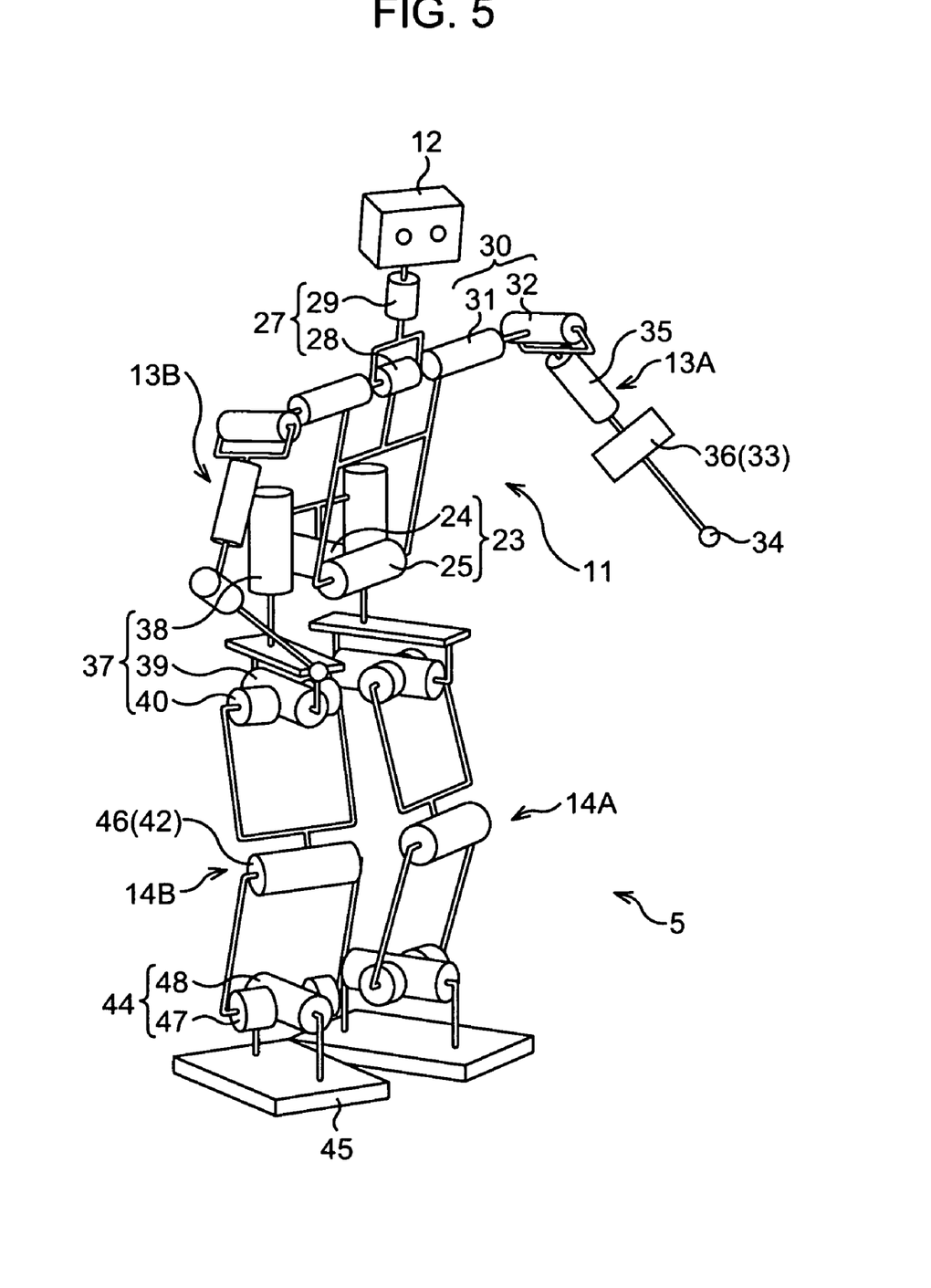
FIG. 5 is a schematic diagram explaining the robot in FIG. 2.

FIG. 3 is an external perspective view of the front of the biped walking robot 5 to which the present invention is applied. FIG. 4 is a perspective view of the rear of the robot 5. FIG. 5 is a diagram explaining the skeleton of the robot 5.

The robot 5 includes a torso unit 11, a head unit 12 arranged above the torso unit 11, arm units 13A and 13B attached to predetermined positions in the upper left and right portions of the torso unit 11, and leg units 14A and 14B attached to predetermined positions in the lower left and right portions of the torso unit 11.

The torso unit 11 is constructed by connecting a frame 21 to a waist base 22 through a waist joint mechanism 23. The frame 21 serves as an upper torso and the waist base 22 serves as a lower torso. In the torso unit 11, when an actuator A1 or A2 of the waist joint mechanism 23 fixed to the waist base 22, serving as the lower torso, is driven, the upper torso can be independently rotated about a roll axis 24 or a pitch axis 25 shown in FIG. 5. The roll axis 24 is orthogonal to the pitch axis 25.

The head unit 12 is attached to the center of the upper surface of a shoulder base 26 through a neck joint mechanism 27. The shoulder base 26 is fixed to the upper end of the frame 21. An actuator A3 or A4 of the neck joint mechanism 27 is driven, so that the head unit 12 can be independently rotated about a pitch axis 28 or a yaw axis 29. The pitch axis 28 is orthogonal to the yaw axis 29 as shown in FIG. 5.

The arm units 13A and 13B are attached to the left and right of the shoulder base 26 through respective shoulder joint mechanisms 30. Each of the arm units 13A and 13B is designed such that when an actuator A5 or A6 of the shoulder joint mechanism 30 is driven, the corresponding arm unit can be independently rotated about a pitch axis 31 or a roll axis 32 shown in FIG. 5. The pitch axis 31 is orthogonal to the roll axis 32.

In this case, each of the arm units 13A and 13B is constructed by connecting an output shaft of an actuator A7, serving as an upper arm, to an actuator A8 as a forearm through an elbow joint mechanism 44 and attaching a hand 34 to the end of the forearm.

In each of the arm units 13A and 13B, when the actuator A7 is driven, the corresponding forearm can be rotated about a yaw axis 35 shown in FIG. 5. When the actuator A8 is driven, the corresponding forearm can be rotated about a pitch axis 36 shown in FIG. 5.

The leg units 14A and 14B are attached to the waist base 22, serving as the lower torso, through respective hip joint mechanisms 37. Each of the leg units 14A and 14B is designed such that when an actuator A9, A10, or A11 of the hip joint mechanism 37 is driven, the corresponding leg unit can be independently rotated about a yaw axis 38, a roll axis 39, or a pitch axis 40 shown in FIG. 5. The yaw axis 38, the roll axis 39, and the pitch axis 40 are orthogonal to each other.

In each of the leg units 14A and 14B, the lower end of a frame 41, serving as an upper leg, is connected to a frame 43, serving as a lower leg, through a knee joint mechanism 42 and the lower end of the frame 43 is connected to a foot 45 through an ankle joint mechanism 44.

Accordingly, in each of the leg units 14A and 14B, when an actuator A12, serving as the knee joint mechanism 42, is driven, the corresponding lower leg can be rotated about a pitch axis 46 shown in FIG. 5. When an actuator A13 or A14 of the ankle joint mechanism 44 is driven, the corresponding foot 45 can be independently rotated about a pitch axis 47 or a roll axis 48 shown in FIG. 5. The pitch axis 47 is orthogonal to the roll axis 48.

The leg units 14A and 14B have foot bottom sensors 91 (FIG. 7), respectively. Each foot bottom sensor 91 is arranged on the bottom (surface to be contact with a floor) of the foot 45. Whether the foot 45 is in contact with the floor is determined on the basis of the ON/OFF state of the corresponding foot bottom sensor 91.

A box control unit 52 has therein a main controller 61 (FIG. 6), which will be described below, and other components. The control unit 52 is arranged on the rear of the waist base 22, serving as the lower torso of the torso unit 11.

Figure 6:
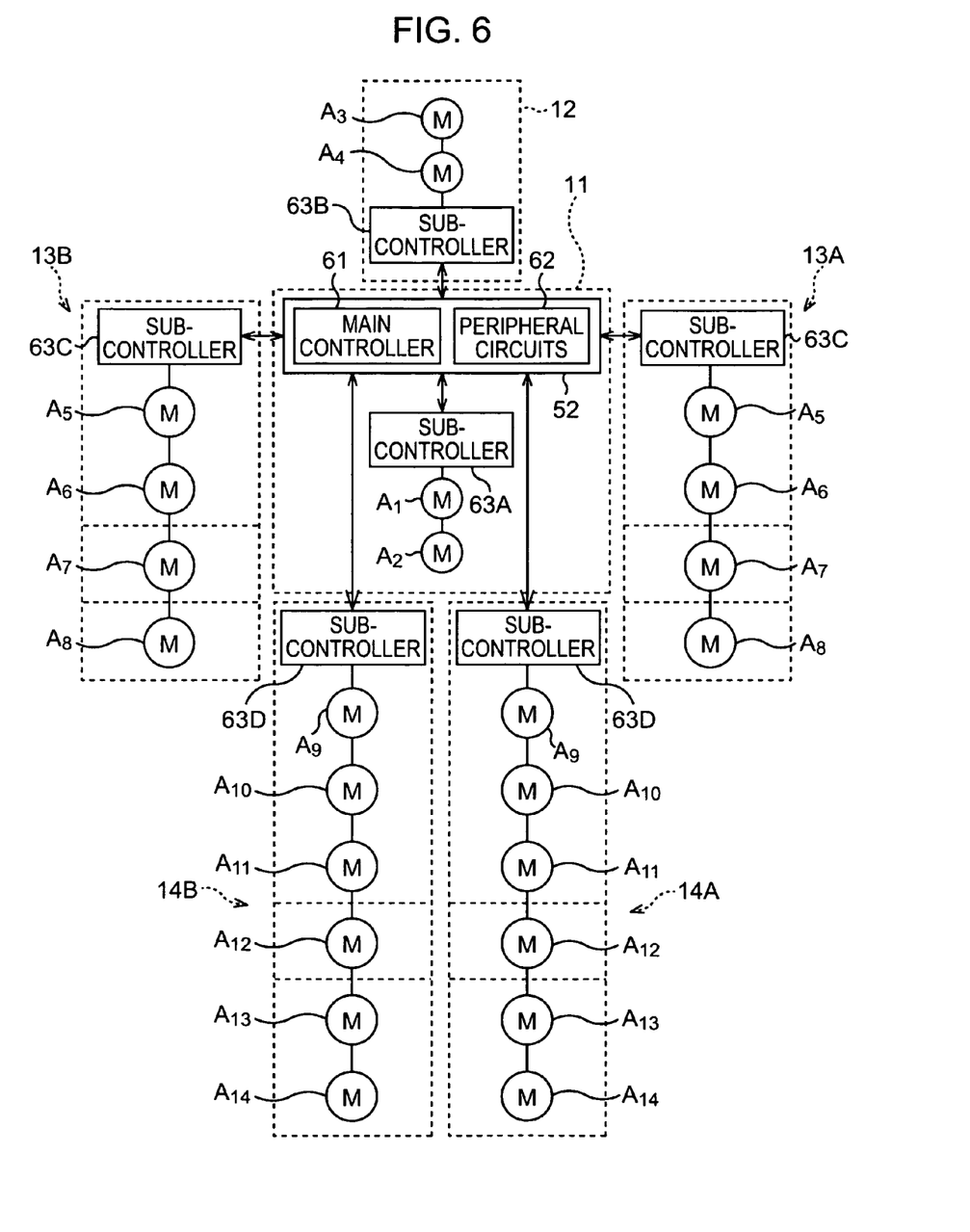
FIG. 6 is a block diagram of the internal structure of the robot in FIG. 2.

FIG. 6 is a diagram explaining the actuators and a control system for the actuators in the robot 5.

The control unit 52 includes the main controller 61 for controlling the operation of the whole robot 5 and peripheral circuits 62, which will be described below. The peripheral circuits 62 include a D/A conversion unit 101, an A/D conversion unit 102, a battery 103, a battery sensor 131, an acceleration sensor 132, a communication unit 105, and an external memory 106 (which are shown in FIG. 7).

The control unit 52 is connected to sub-controllers 63A to 63D arranged in the respective component units (i.e., the torso unit 11, the head unit 12, the arm units 13A and 13B, and the leg units 14A and 14B). The control unit 52 supplies necessary power supply voltage to each of the sub-controllers 63A to 63D and communicates with the sub-controllers 63A to 63D.

The sub-controllers 63A to 63D are connected to the corresponding actuators A1 to A14 in the component units, respectively. On the basis of various control commands supplied from the main controller 61, the sub-controllers 63A to 63D control the actuators A1 to A14 in the component units such that each actuator is driven in a specified state.

Figure 7:
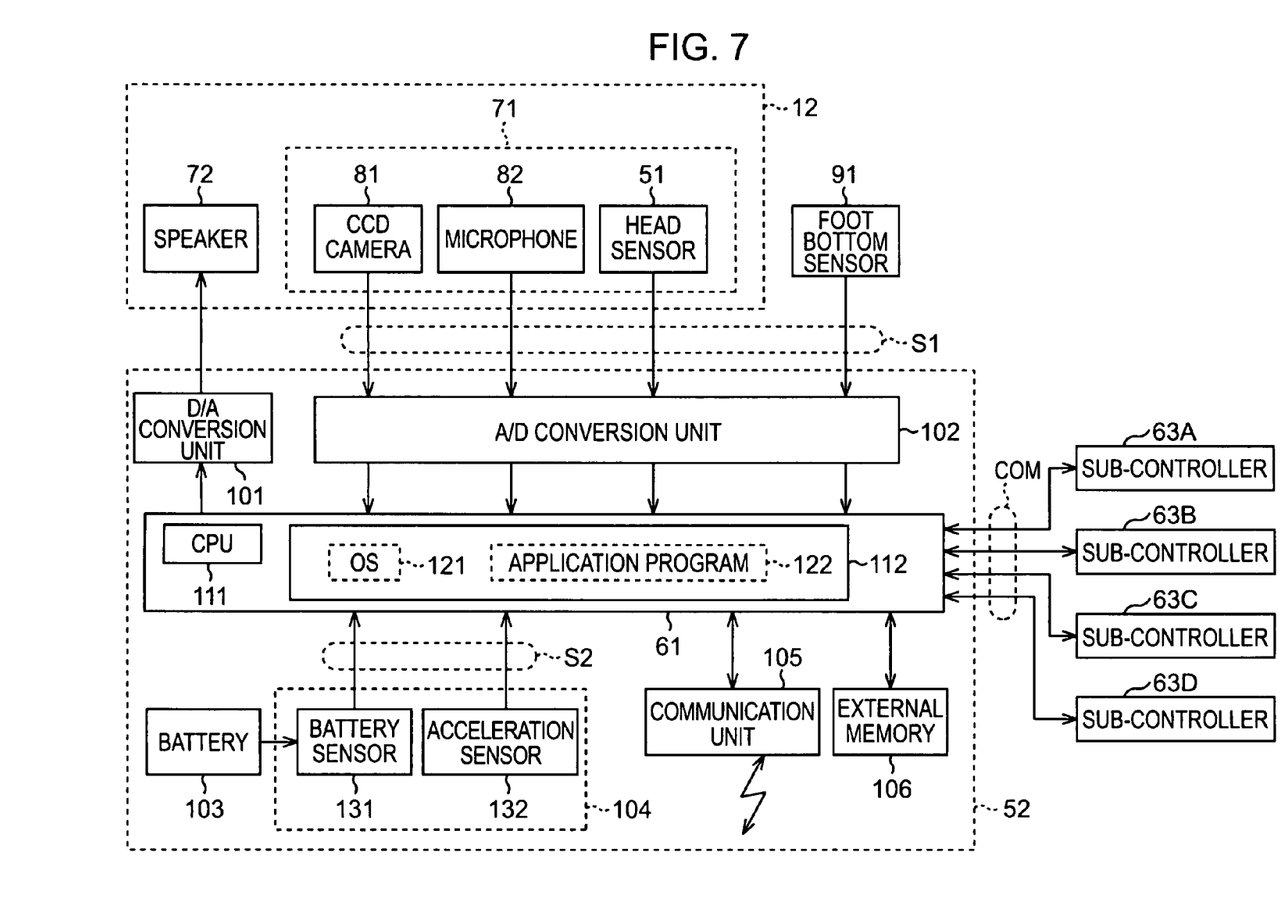
FIG. 7 is a block diagram mainly explaining components related to control of the robot in FIG. 2.

FIG. 7 is a block diagram of the internal structure of the robot 5.

The head unit 12 has an external sensor unit 71, which includes a CCD (Charge Coupled Device) camera 81 functioning as an "eye" of the robot 5, a microphone 82 functioning as an "ear" thereof, and a head sensor 51, and a speaker 72 functioning as a "mouth" of the robot 5 in predetermined positions. The control unit 52 has therein an internal sensor unit 104 including the battery sensor 131 and the acceleration sensor 132. The feet 45 of the leg units 14A and 14B have the foot bottom sensors 91 on the bottom surfaces, respectively, each foot bottom sensor 91 functioning as one of "somatic sensations" of the robot 5.

In the external sensor unit 71, the CCD camera 81 captures an image of surrounding circumstances and transmits captured image signals to the main controller 61 through the A/D conversion unit 102. The microphone 82 collects a command speech, e.g., "Walk", "Stop", or "Raise your right hand", given as a speech input from a user, and transmits captured speech signals to the main controller 61 through the A/D conversion unit 102.

The head sensor 51 is arranged in the upper portion of the head unit 12 as shown in, e.g., FIGS. 3 and 4. The head sensor 51 detects a pressure caused by a user's physical approach, e.g., "petting" or "slapping", and transmits a pressure detection signal as a result of the detection to the main controller 61 through the A/D conversion unit 102.

The foot bottom sensor 91 is arranged on the bottom of each foot 45. When the foot 45 is in contact with the floor, the foot bottom sensor 91 transmits a contact signal to the main controller 61 through the A/D conversion unit 102. The main controller 61 determines based on the presence or absence of a contact signal whether the corresponding foot 45 is in contact with the floor. Since the foot bottom sensors 91 are arranged on both the feet 45 of the leg units 14A and 14B, respectively, the main controller 61 can determine based on the presence or absence of each contact signal whether both the feet 45 of the robot 5 are in contact with the floor, whether either foot is in contact with the floor, or whether both feet are not in contact with the floor.

The control unit 52 includes the main controller 61, the D/A conversion unit 101, the A/D conversion unit 102, the battery 103, the internal sensor unit 104, the communication unit 105, and the external memory 106.

The D/A (Digital/Analog) conversion unit 101 converts digital signals supplied from the main controller 61 into analog signals and then supplies the signals to the speaker 72. The A/D (Analog/Digital) conversion unit 102 converts analog signals supplied from the CCD camera 81, the microphone 82, the head sensor 51, and the foot bottom sensors 91 into digital signals and then supplies the signals to the main controller 61.

In the internal sensor unit 104, the battery sensor 131 detects the amount of energy remaining in the battery 103 at regular intervals and transmits a battery level detection signal indicating a result of the detection to the main controller 61. The acceleration sensor 132 detects acceleration in three axial directions (x, y, and z axes) with respect to the motion of the robot 5 at regular intervals and transmits an acceleration detection signal indicating a result of the detection to the main controller 61.

The main controller 61 includes a CPU 111 for controlling the whole operation of the main controller 61 and an internal memory 112. The internal memory 112 stores an OS (Operating System) 122 which runs so that the CPU 111 controls the respective units, an application program 122, and other necessary data.

On the basis of image signals, speech signals, pressure detection signals, contact signals (hereinafter, collectively referred to as external sensor signals S1), which are supplied from the CCD camera 81, the microphone 82, and the head sensor 51 in the external sensor unit 71, and the foot bottom sensors 91, respectively, battery level detection signals and acceleration detection signals (hereinafter, collectively referred to as internal sensor signals S2) supplied from the battery sensor 131 and the acceleration sensor 132 in the internal sensor unit 104, respectively, the main controller 61 determines the surrounding and internal circumstances of the robot 5, an instruction from the user, or the presence or absence of a user's approach.

On the basis of the surrounding and internal circumstances of the robot 5, an instruction from the user or a command from the personal computer 4-2 received by the communication unit 105, and a control program stored in the internal memory 112 or various control parameters stored in the external memory 106 loaded at that time, the main controller 61 determines an action of the robot 5, generates control commands COM based on a result of the determination, and transmits the control commands COM to the respective sub-controllers 63A to 63D necessary for the determined action. On the basis of the control commands COM, the sub-controllers 63A to 63D drive the respective actuators A1 to A14. Consequently, for example, the robot 5 can perform a mechanical motion, e.g., shake the head unit 12 longitudinally or laterally, raise the arm unit 13A or 13B, or move the leg units 14A and 14B by turns to walk.

As necessary, the main controller 61 supplies predetermined speech signals to the speaker 72 to output speech based on the speech signals to the outside.

The communication unit 105 communicates with the access point 2 by radio based on IEEE802.11b. When the version of the OS 121 or the application program 122 is upgraded, therefore, the upgraded OS or application program is downloaded through the communication unit 105 and is stored in the internal memory 112. In addition, a predetermined command can be received by the communication unit 105 and be then supplied to the CPU 111.

The external memory 106 includes, e.g., an EEPROM (Electrically Erasable Programmable Read-only Memory). The external memory 106 can be loaded into the torso unit 11 through a slot (not shown) formed in the torso unit 11. The external memory 106 stores, e.g., emotion models, which will be described below.

Figure 8:
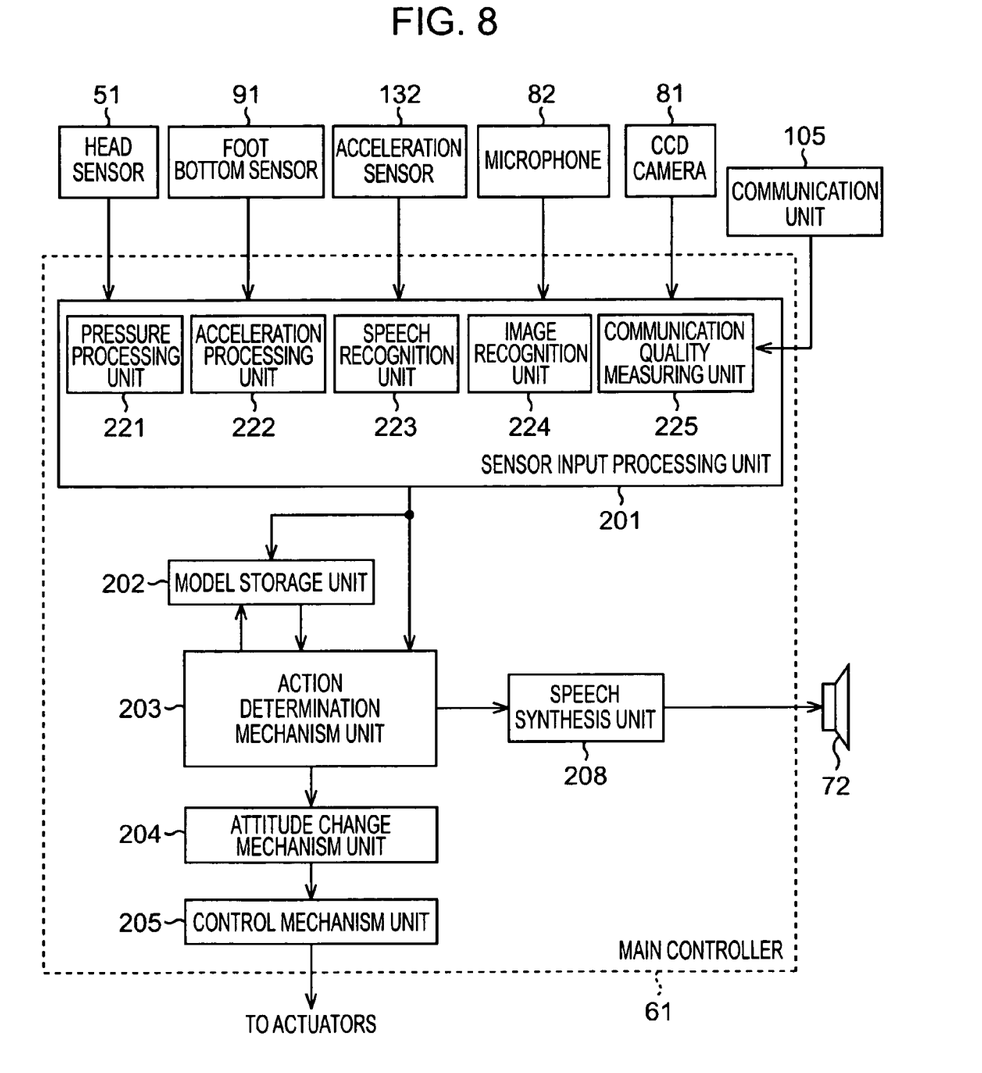
FIG. 8 is a block diagram of the structure of a main controller in FIG. 7.

FIG. 8 shows an example of the functional structure of the main controller 61 in FIG. 7. The main controller 61 executes the OS 121 and the application program 122 stored in the internal memory 112, thus realizing the functional structure shown in FIG. 8. In FIG. 8, the D/A conversion unit 101 and the A/D conversion unit 102 are omitted.

In the main controller 61, a sensor input processing unit 201 recognizes a specific external condition, a user's specific approach, and an instruction from the user on the basis of pressure detection signals, contact signals, acceleration detection signals, speech signals, image signals, and communication quality signals of radio signals supplied from the head sensor 51, the foot bottom sensors 91, the acceleration sensor 132, the microphone 82, the CCD camera 81, and the communication unit 105, respectively. The sensor input processing unit 201 sends state recognition information indicating a result of the recognition to each of a model storage unit 202 and an action determination mechanism unit 203.

In other words, the sensor input processing unit 201 includes a pressure processing unit 221, an acceleration processing unit 222, a speech recognition unit 223, an image recognition unit 224, and a communication quality measuring unit 225.

The pressure processing unit 221 processes pressure detection signals supplied from the head sensor 51. For example, when detecting a pressure of a predetermined threshold or higher applied for a short time as a result of the process, the pressure processing unit 221 recognizes that the robot is slapped (scolded). When detecting a pressure, which is lower than the predetermined threshold, applied for a long time, the pressure processing unit 221 recognizes that the robot is petted (praised). The pressure processing unit 221 sends state recognition information as a result of the recognition to each of the model storage unit 202 and the action determination mechanism unit 203.

In addition, the pressure processing unit 221 processes contact signals supplied from the foot bottom sensors 91. For example, when receiving a contact signal from the foot bottom sensor 91 arranged on the foot 45 of the leg unit 14A, the pressure processing unit 221 recognizes that the foot 45 of the leg unit 14A is in contact with the floor (ground). When the pressure processing unit 221 does not receive a contact signal from the foot bottom sensor 91 of the leg unit 14A, the pressure processing unit 221 recognizes that the foot 45 of the leg unit 14A is not in contact with the floor (ground). Similarly, on the basis of the presence or absence of a contact signal from the foot bottom sensor 91 of the leg unit 14B, the pressure processing unit 221 recognizes whether the foot 45 of the leg unit 14B is in contact with the floor (ground). The pressure processing unit 221 sends state recognition information as a result of the recognition to each of the model storage unit 202 and the action determination mechanism unit 203.

On the basis of an acceleration detection signal supplied from the acceleration sensor 132, the acceleration processing unit 222 recognizes the direction and amplitude of acceleration of the torso unit 11 and then sends state recognition information as a result of the recognition to each of the model storage unit 202 and the action determination mechanism unit 203.

The speech recognition unit 223 performs speech recognition using speech signals from the microphone 82. The speech recognition unit 223 notifies the model storage unit 202 and the action determination mechanism unit 203 of data regarding a character string or character strings, e.g., "Walk", "Down", or "Chase the ball", as state recognition information, serving as a result of the speech recognition.

The image recognition unit 224 performs image recognition processing using image signals supplied from the CCD camera 81. When detecting "a red round object" or "a plane which is perpendicular to the ground and has a predetermined height or more", the image recognition unit 224 notifies the model storage unit 202 and the action determination mechanism unit 203 of a result of the image recognition, e.g., "there is a ball" or "there is a wall", as state recognition information.

The communication quality measuring unit 225 measures the quality of communication on the basis of signals received from the access point 2 through the communication unit 105 and sends state recognition information as a result of the measurement to the action determination mechanism unit 203. The communication quality means, e.g., radio signal strength corresponding to resistance to noise or error rate (if interfering waves occur in a burst manner in a spread spectrum band, an error occurs in a communication packet).

The model storage unit 202 stores and manages emotion models, instinct models, growth models for exhibiting emotions, instincts, and growth steps of the robot 5.

In this instance, the emotion models exhibit emotional states (levels), such as "happiness", "sadness", "anger", and "amusement", using values within a predetermined range (of, e.g., −1.0 to 1.0). An emotion model value is changed on the basis of state recognition information supplied from the sensor input processing unit 201 and elapsed time.

The instinct models exhibit appetite states (levels), such as "eating instinct", "sleep instinct", and "movement instinct", using values within a predetermined range. An instinct model value is changed on the basis of state recognition information supplied from the sensor input processing unit 201 and elapsed time.

The growth models exhibit growth states (levels), such as "child phase", "adolescent phase", "middle age phase", and "old age phase", using values within a predetermined range. A growth model value is changed on the basis of state recognition information supplied from the sensor input processing unit 201 and elapsed time.

The model storage unit 202 transmits state information to the action determination mechanism unit 203. The state information concerns emotion, instinct, and growth states shown by respective emotion-model, instinct-model, and growth-model values mentioned above.

In addition to state recognition information supplied from the sensor input processing unit 201, the model storage unit 202 receives action information from the action determination mechanism unit 203, the action information indicating the details of the current or past action of the robot 5, e.g., "walking for a long time". When receiving the same state recognition information, the model storage unit 202 generates different state information in accordance with the action of the robot 5 indicated by action information.

For example, when the robot 5 greets the user and the user then pets the head of the robot 5, action information indicating that the robot 5 has greeted the user and state recognition information indicating that the robot 5 has been petted by the user are supplied to the model storage unit 202. In this case, the model storage unit 202 increases the emotion model value exhibiting "happiness".

The action determination mechanism unit 203 determines the next action on the basis of state recognition information supplied from the sensor input processing unit 201, state information supplied from the model storage unit 202, and elapsed time and then outputs action instruction information regarding the details of the determined action to an attitude change mechanism unit 204.

The attitude change mechanism unit 204 generates attitude change information to change the current attitude of the robot 5 to the next attitude on the basis of the action instruction information supplied from the action determination mechanism unit 203 and then transmits the attitude change information to a control mechanism unit 205.

The control mechanism unit 205 generates control signals to drive the respective actuators A1 to A14 in accordance with the attitude change information supplied from the attitude change mechanism unit 204 and transmits the control signals to the sub-controllers 63A to 63D. On the basis of the control signals, the sub-controllers 63A to 63D drive appropriate actuators, thus allowing the robot 5 to perform various actions.

A speech synthesis unit 208 receives speech instruction information from the action determination mechanism unit 203. In accordance with the speech instruction information, the speech synthesis unit 208 performs, e.g., speech synthesis by rule and supplies synthesized speech to the speaker 72, which outputs the synthesized speech.

Figure 9:
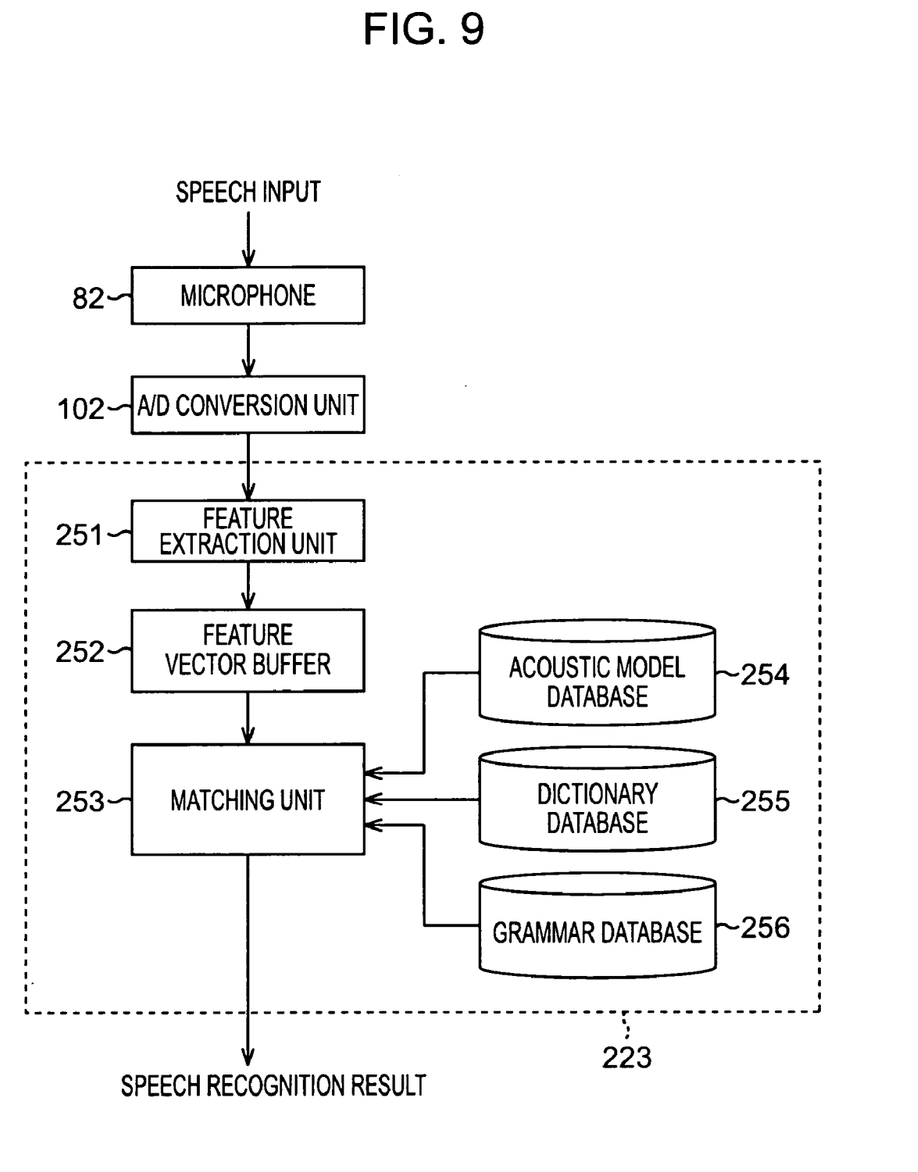
FIG. 9 is a block diagram of the structure of a speech recognition unit in FIG. 8.

FIG. 9 is a functional block diagram of functions of the speech recognition unit 223 in the sensor input processing unit 201.

Speech data is supplied to the speech recognition unit 223 through the microphone 82 and the A/D conversion unit 102 in FIG. 7. The speech data is supplied to a feature amount extraction unit 251.

The feature extraction unit 251 performs acoustic analysis processing to the speech data supplied from the A/D conversion unit 102 every appropriate frame, thus extracting a feature vector, serving as a feature amount, e.g., an MFCC (Mel Frequency Cepstrum Coefficient).

A feature vector obtained every frame through the feature extraction unit 251 is in turn supplied to a feature vector buffer 252 and is stored therein. Therefore, the feature vector buffer 252 stores feature vectors of frames on a time series basis.

For example, the feature vector buffer 252 stores time-series feature vectors obtained from the start to the end (speech segment) of certain speech.

A matching unit 253 recognizes speech (input speech) received by the microphone 82 using the feature vectors stored in the feature vector buffer 252 based on, e.g., continuous density HMM, as necessary, with reference to an acoustic model database 254, a dictionary database 255, and a grammar database 256.

In other words, the acoustic model database 254 stores a set of acoustic models indicating acoustic features in predetermined units (PLU (Phonetic-Linguistic-Units)), such as phoneme or syllables in a language of speech to be recognized. The dictionary database 255 stores a word dictionary including information (phonological information) concerning pronunciations of words (vocables) to be recognized. The grammar database 256 stores a grammar rule (language model) which describes how to chain (connect) words contained in the word dictionary of the dictionary database 255.

The matching unit 253 connects acoustic models stored in the acoustic model database 254 with reference to the word dictionary in the dictionary database 255, thus forming a word acoustic model (word model). In addition, the matching unit 253 connects several word models with reference to the grammar rule stored in the grammar database 256 and then performs the matching between the connected word models and the time-series feature vectors according to the continuous density HMM, thus recognizing speech received by the microphone 82. In other words, the matching unit 253 calculates a score indicating the likelihood of the observed time-series feature vectors stored in the feature vector buffer 252 from word model sequences generated as mentioned above. For example, the matching unit 253 detects the word model sequence with the highest score and outputs a word sequence corresponding to the word model sequence as a result of the speech recognition.

Figure 10:
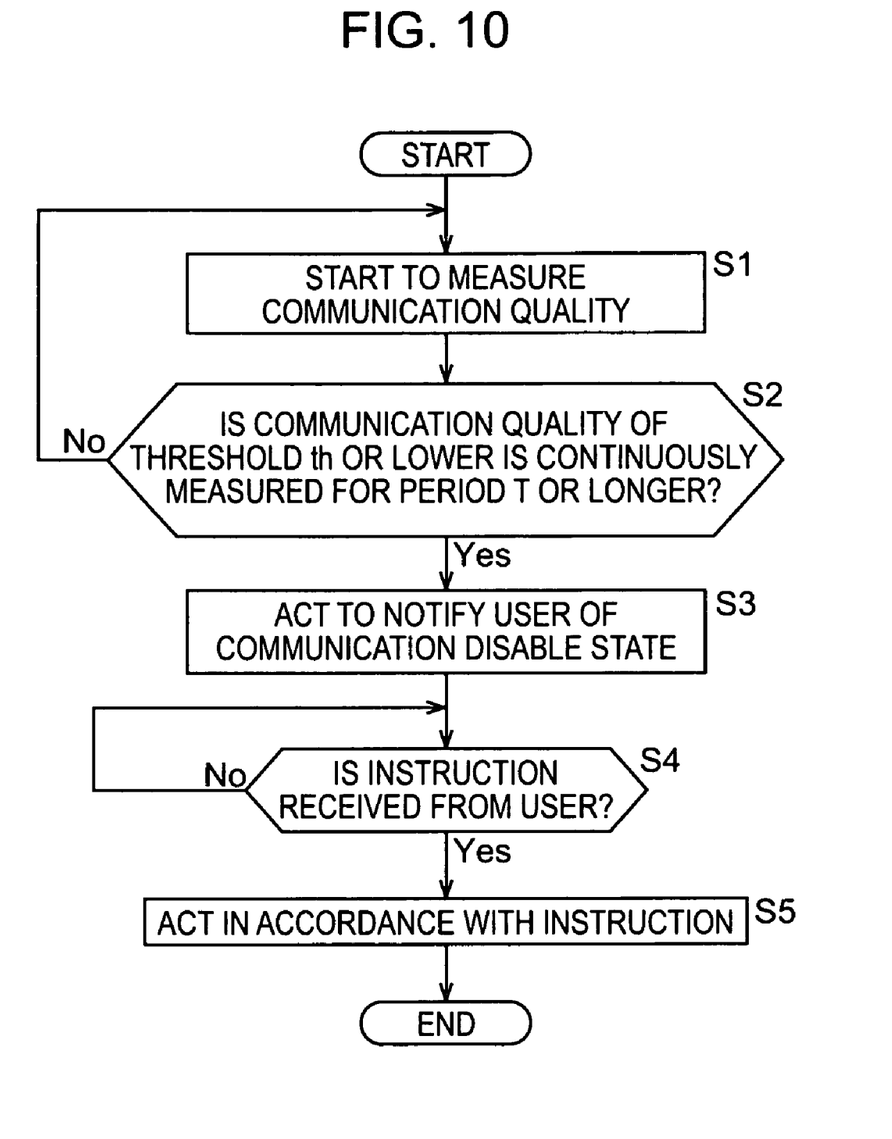
FIG. 10 is a flowchart explaining the operation of the robot in FIG. 2.

The operation of the robot 5 when notifying the user of the state of communication with the access point 2 will now be described with reference to a flowchart of FIG. 10.

In step S1, the main controller 61 of the robot 5 starts to measure the quality of communication (e.g., radio signal strength or error rate) based on signals received from the access point 2 through the communication unit 105. In this example, the communication quality is measured at intervals of several tens of seconds.

In step S2, the main controller 61 of the robot 5 determines whether the communication quality of a predetermined threshold th (a predetermined strength when radio signal strength indicates the communication quality or a predetermined error rate when error rate indicates the communication quality) or lower is continuously measured for a predetermined period T or longer. If YES, the operation proceeds to step S3.

In step S3, the main controller 61 of the robot 5 generates speech instruction information in order to allow the robot 5 to generate speech indicating that the robot 5 cannot communicate with the access point 2, e.g., a voice message of "I cannot see the access point. What should I do?" and also performs speech synthesis by rule in accordance with the information. After that, the main controller 61 supplies synthesized speech to the speaker 72, thus outputting the speech. Consequently, the robot 5 generates a voice message of "I cannot see the access point. What should I do?".

When the robot 5 is moving away from the access point 2, the robot 5 can also be allowed to generate a voice message of "I cannot see the access point. Do I have to go here?". As mentioned above, a voice message to be generated from the robot 5 is determined in further consideration of the details of the current action of the robot 5, thus resulting in more natural speech of the robot 5.

In step S4, the main controller 61 of the robot 5 is in standby mode until the main controller 61 receives an instruction from the user. When receiving an instruction from the user, the operation proceeds to step S5. The main controller 61 determines an action in accordance with the instruction, generates action instruction information, attitude change instruction, and control signals corresponding to the details of the determined action, and transmits the control signals to the respective actuators A. Thus, the robot 5 takes an action in response to the instruction of the user.

For example, when a refrigerator is placed at the front of the access point 2 as viewed from the robot 5, the user issues an order to prevent such a situation, e.g., says "Take 10 steps to the left". If a microwave oven placed near the robot 5 is running, the user says, e.g., "Hold on" (and the user turns off the microwave oven). When the robot 5 moves away from the access point 2 and generates a voice message of "I cannot see the access point. Do I have to go here?", the user says "Don't go there".

When the robot 5 receives the above-mentioned speech, the robot 5 recognizes the speech as an instruction. For example, in response to the instruction of "Take 10 steps to the left", the robot 5 moves to the left only by 10 steps (the operation to move the leg unit 14A to the left by one step and then move the leg unit 14B to the left by one step is repeated 10 times). In response to the instruction of "Hold on" or "Don't go there", the robot 5 stops the current action. Prior to allowing the robot 5 to act in accordance with the user's speech, the robot 5 can generate a voice message indicating that robot 5 has recognized an instruction of the user, e.g., "Yes, understood".

The above-mentioned example relates to the case where the robot 5 notifies the user using speech of the fact that the robot 5 cannot communicate with the access point 2. In addition, the robot 5 can take a predetermined action (gesture), e.g., shake the head unit 12 from side to side.

As mentioned above, the robot 5 notifies the user of the state of communication quality using functions peculiar to the autonomous robot. Thus, the user can easily grasp the communication state.

In the present specification, steps describing a program include not only steps which are executed on a time series basis according to the described order but also steps which are not necessarily executed on a time series basis but are executed simultaneously or individually.

In the present specification, a system is defined as a unified whole of apparatuses each including a plurality of units.

INDUSTRIAL APPLICABILITY

According to the present invention, a user can be easily informed of, e.g., the state of communication.

The invention claimed is:

1. An autonomous robot apparatus which communicates with a communication apparatus by radio, said robot apparatus communicates with a user by non-radio communication and independently determines an action in accordance with an instruction from the user or a surrounding environment, the robot apparatus comprising:
measuring means for measuring a quality of communication of radio signals received from the communication apparatus;
determining means for determining the action on the basis of the communication quality measured by the measuring means and the instruction from the user; and
processing means for performing the action determined by the determining means,
wherein when the communication quality measured by the measuring means indicates loss of radio communication with the communication apparatus, the robot apparatus physically communicates the loss of radio communication to the user via non-radio communication and requests another instruction from the user.

2. The robot apparatus according to claim 1, wherein the determining means determines the action on the basis of the details of the current action of the robot apparatus and the communication quality measured by the measuring means.

3. The robot apparatus according to claim 1, wherein
the determining means determines the generation of predetermined speech, and
the processing means outputs the speech through a speaker.

4. A information processing method for an autonomous robot apparatus which communicates with a communication apparatus by radio, said robot apparatus communicates with a user by non-radio communication and independently determines an action in accordance with an instruction from the user or a surrounding environment, the method comprising the steps of:
a measuring step of measuring a quality of communication of radio signals received from the communication apparatus;

a determining step of determining the action on the basis of the communication quality measured in the measuring step and the instructions from the user; and a processing step of performing the action determined in the determining step, wherein when the communication quality measured in the measuring step indicates loss of radio communication with the communication apparatus, the robot apparatus physically communicates the loss of radio communication to the user via non-radio communication and requests another instruction from the user.

5. A computer readable medium having a program for an autonomous robot apparatus which communicates with a communication apparatus by radio, said robot apparatus communicates with a user by non-radio communication and independently determines an action in accordance with an instruction from the user or a surrounding environment, the program allowing a computer to execute a process comprising the steps of:

a measuring step of measuring a quality of communication of radio signals received from the communication apparatus;

a determining step of determining the action on the basis of the communication quality measured in the measuring step and the instructions from the user; and a processing step of performing the action determined in the determining step, wherein when the communication quality measured in the measuring step indicates loss of radio communication with the communication apparatus, the robot apparatus physically communicates the loss of radio communication to the user via non-radio communication and requests another instruction from the user.

6. The robot apparatus according to claim 1, wherein the measured communication quality of the radio signals is measured for a predetermined time and for a predetermined threshold.

7. The robot apparatus according to claim 1, wherein the measuring means outputs state recognition information, based on the measured communication quality, to the determining means.

8. The robot apparatus according to claim 1, wherein the measured communication quality of received signals is supplied from sensors.

9. The robot apparatus according to claim 8, wherein the measuring means outputs state recognition information for the sensors, based on the measured communication quality, to the determining means.

10. The robot apparatus according to claim 8, wherein the sensors include a head sensor, foot bottom sensors, acceleration sensor, microphone and camera.

11. The robot apparatus according to claim 7, wherein the determining means determines a next action based on the state recognition information, previous state recognition information from a storage means and elapsed time.

12. The robot apparatus according to claim 9, wherein the determining means determines a next action based on the state recognition information, previous state recognition information from a storage means and elapsed time.

13. The robot apparatus according to claim 1, wherein the communication quality includes signal strength corresponding to resistance to noise or error rate in a communication packet due to burst interference.

14. The robot apparatus according to claim 1, wherein the robot apparatus notifies the user of the loss of radio communication using functions peculiar to the robot apparatus.

15. The robot apparatus according to claim 1, wherein the robot apparatus notifies the user of the loss of radio communication using speech.

16. The robot apparatus according to claim 1, wherein the robot apparatus notifies the user of the loss of radio communication via a gesture by movement of one of its bodily units.

17. The robot apparatus according to claim 1, wherein the robot apparatus is in standby state after notifying the user of the loss of radio communication until receiving an instruction from the user.

18. The robot apparatus according to claim 1, wherein said communication apparatus communicates, via a network, with a household electrical appliance and a personal computer, and said robot controls the household electrical appliance and receives a command from the personal computer via the communication apparatus.

19. The robot apparatus according to claim 1, wherein said robot apparatus is a biped walking humanoid robot including bodily units of a torso unit, head unit, arm units, leg units and an external sensor unit including a camera functioning as an eye, a microphone functioning as an ear and a speaker functioning as a mouth.

20. The robot apparatus according to claim 19, wherein the user is notified of a state of communication between the communication apparatus and the robot apparatus via at least one of the bodily units and external sensor unit of the robot.

21. An autonomous robot apparatus which communicates with a communication apparatus by radio, said robot apparatus communicates with a user by non-radio communication and independently determines an action in accordance with an instruction from the user or a surrounding environment, the robot apparatus comprising:

measuring unit measuring a quality of communication of radio signals received from the communication apparatus;

determining unit determining the action on the basis of the communication quality measured by the measuring unit and the instruction from the user; and processing unit performing the action determined by the determining unit, wherein when the communication quality measured by the measuring unit indicates loss of radio communication with the communication apparatus, the robot apparatus physically communicates the loss of radio communication to the user via non-radio communication and requests another instruction from the user.

* * * * *